Sept. 15, 1931. A. W. ALTORFER Re. 18,185

WASHING MACHINE

Original Filed May 2, 1921 4 Sheets-Sheet 1

INVENTOR.

Alphus W. Altorfer

By LaPorte & LaPorte

ATTY'S

Sept. 15, 1931. A. W. ALTORFER Re. 18,185

WASHING MACHINE

Original Filed May 2, 1921 4 Sheets-Sheet 2

INVENTOR.

By Alphens W. Altorfer
LaPorte & LaPorte

ATTY'S

Sept. 15, 1931. A. W. ALTORFER Re. 18,185

WASHING MACHINE

Original Filed May 2, 1921 4 Sheets-Sheet 3

INVENTOR.
Alpheus W. Altorfer
By LaPorte & LaPorte
ATTY'S

Sept. 15, 1931. A. W. ALTORFER Re. 18,185

WASHING MACHINE

Original Filed May 2, 1921 4 Sheets-Sheet 4

INVENTOR

Alphen W. Altorfer

By Laborate & Laborate

ATTY'S

Reissued Sept. 15, 1931

Re. 18,185

UNITED STATES PATENT OFFICE

ALPHEUS W. ALTORFER, OF PEORIA, ILLINOIS, ASSIGNOR TO ALTORFER BROS. COMPANY, OF EAST PEORIA, ILLINOIS, A CORPORATION OF ILLINOIS

WASHING MACHINE

Original No. 1,574,334, dated February 23, 1926, Serial No. 465,991, filed May 2, 1921. Application for reissue filed November 28, 1927. Serial No. 236,346.

This invention has reference to new and useful improvements in washing machines, and particularly to that type of machines used for domestic purposes in the home.

One of the objects of the present invention is to improve the means for transmitting power from a motor supported on the machine base to the agitator or washing element of the machine.

The invention has for a further object to provide an improved operating means for the agitator, including a vertical shaft to the agitator and a reduction gearing in such operating means, and to an off-set vertical shaft to the wringer means and interposed reduction gearing to said operating means.

A further object of the invention is to provide new and improved clutch means for connecting the agitator to its vertical operating shaft.

That the invention may be more fully understood reference is had to the accompanying drawings forming a part of the description illustrating a preferred embodiment of the invention, in which.

Like characters of reference denote corresponding parts throughout the figures.

Figure 1:
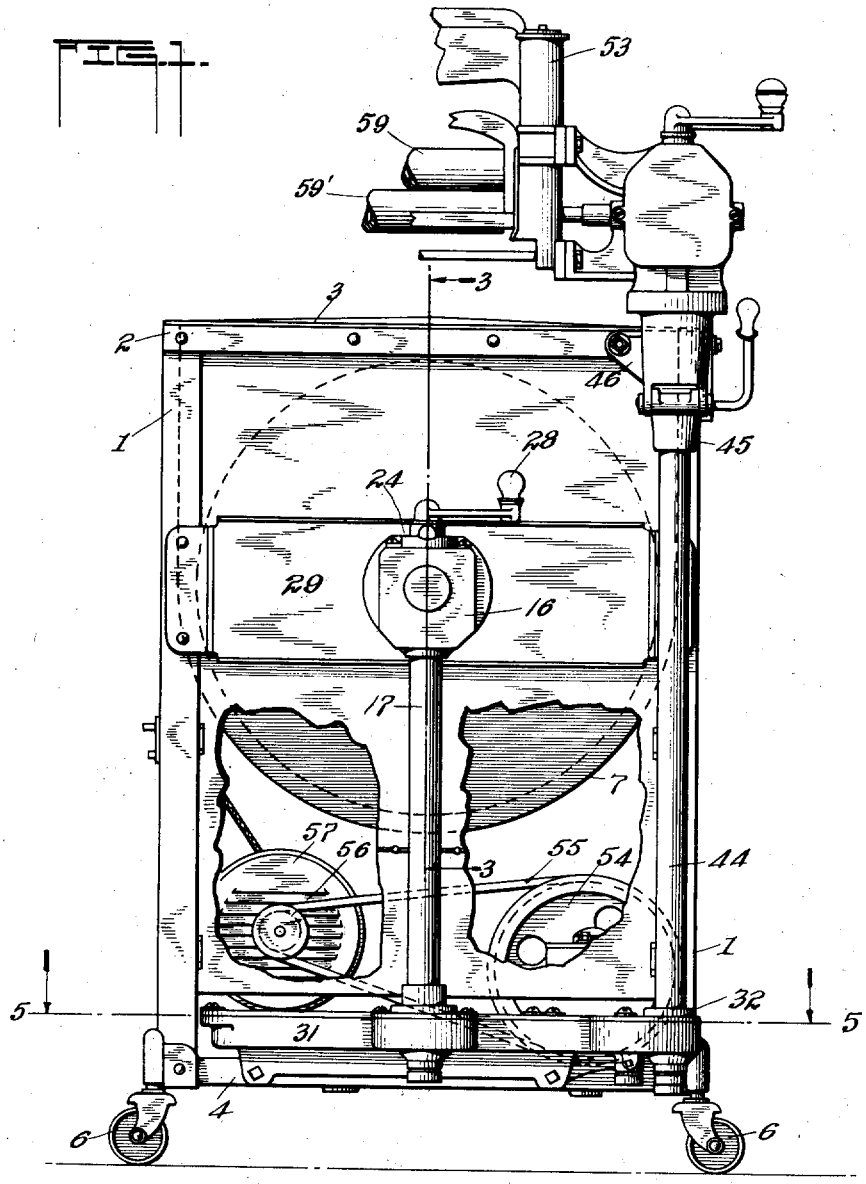
Fig. 1 is a side elevation of a washing machine embodying my improvements with a part of the wringer mechanism broken away and with a part of the machine casing also broken away.
Figure 2:
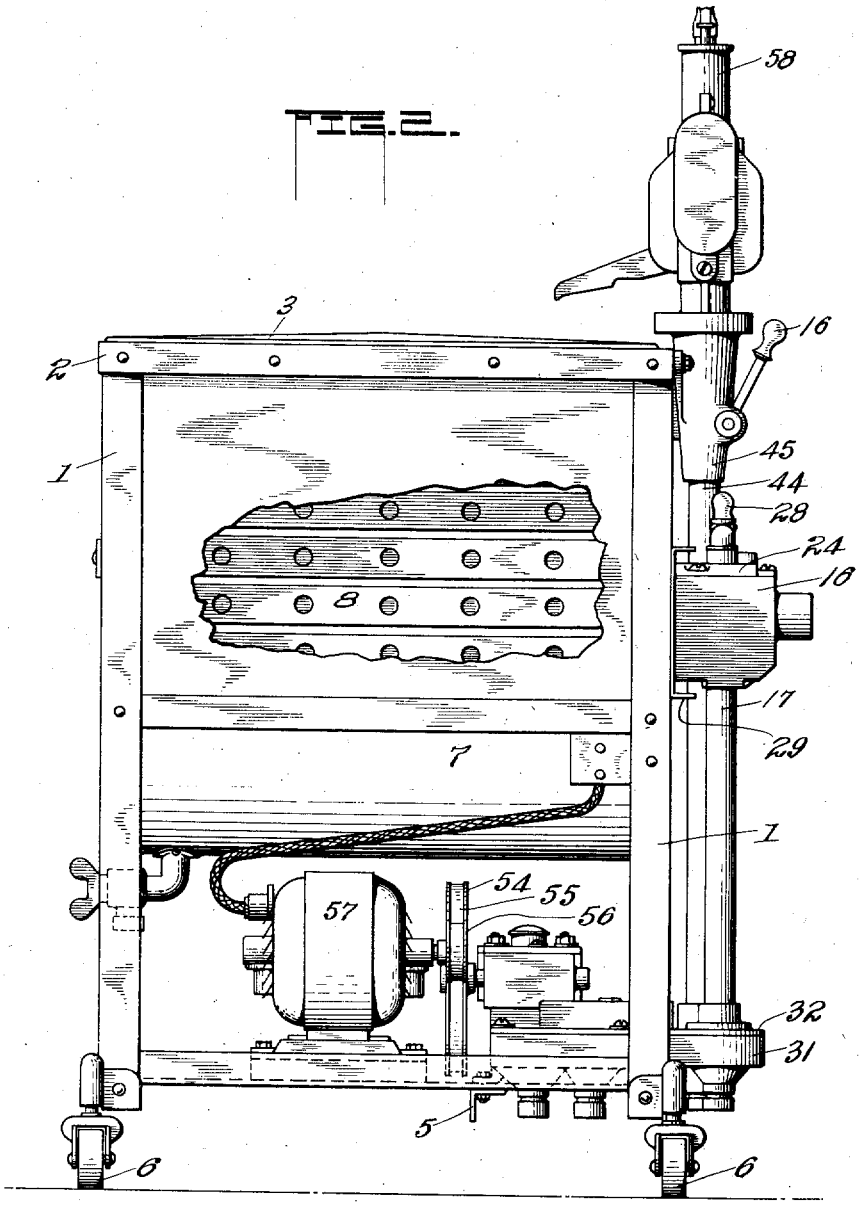
Fig. 2 is an elevation of the machine, looking in at the left end of Fig. 1, part of the machine casing being broken away.

In the drawings, the frame of the machine is preferably shown as comprising the four corner posts or standards 1, the connecting head rail 2, upon which rests the removable lid or cover 3, the base rails 4, and a cross rail 5. This structure is supported upon the caster wheels 6 having a swivel connection with the lower ends of the corner posts or standards 1, and provides a means for moving the machine with convenience and ease from one place to another.

To enclose the agitator or washing element of the machine, a casing 7 of suitable design is provided and arranged for suitable connection with the posts or standards of the machine. 8 designates the agitator or washing element of the machine and is preferably disclosed in the form of a cylinder which is not unlike cylinders of this character in general use, except the mounting which will permit the cylinder to be inserted and removed from the machine casing, and the means or mechanism for clutching the agitator to the power mechanism for imparting an alternate rotary motion thereto. To the ends of the cylinder 8 are attached plates 9 and 10, the former being preferably somewhat larger in diameter than the latter, and each is provided with a trunnion 11 adapted to rest and have a journal-bearing in bearing plates on the machine frame. The trunnion 11 of the plate 9 is preferably formed or provided with a clutch socket 12 preferably triangular in shape, although it may be of any other desired shape suitable to receive a slidable clutch member for connecting the agitator 8 with the power mechanism of the machine. In this instance the clutch member designated 13, is a slidable shaft formed on its inner end with a head 14, which in shape, corresponds to the contour of the socket 12 in the trunnion 11. Said shaft is journaled in the bearing ends 15 and 15′, of a housing 16, supported on the upper end of a casing or sleeve 17 and formed or provided with a bearing 18 in axial alignment with said sleeve 17 to receive a vertically disposed shaft 19 operatively carried in said sleeve and passing up through and journaled in the bearing 18 of the housing 16.

Figure 4:
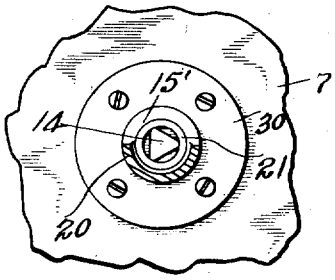
Fig. 4 is a detail partially in section as the same would appear if taken on the line 4—4 Fig. 3.

The bearing end 15′ of the housing 16 is preferably formed with a semispherical plate extension 20, see Fig. 4, on which rests and may have a bearing the socket trunnion 11 on the plate 9 secured to the agitator 8. A bushing 21 forming a stuffing box, is threaded into the bearing end 15′ through which the shaft 13 may have axial movement On the upper end of the vertically disposed shaft 19 is secured a bevel gear wheel 22 rotated within the housing 16 and said gear wheel is in constant mesh and drives a bevel gear wheel 23 carried by the shaft 13 and in which the shaft 13 has axial movement. In other words, the shaft 13 and bevel gear wheel 23 have a feathered key connection, whereby the said shaft may be driven through the operation of the gear wheel 23, and yet may have a slidable relation therein for clutching the end 14 of said shaft in the socket 12 of the trunnion 11, and declutching it therefrom.

The housing 16 is open at its upper end and closed by a cap plate or cover 24 arranged to be removably secured on said housing. These parts may be assembled, as may be understood, by inserting the shaft 13 into the housing through the bearing end 15′, after the gear wheel 22 has been secured on the upper end of the shaft 19, and during the placing of the shaft 13 the gear wheel 23 may be held in position while the shaft 13 is inserted therethrough, after which the cap plate or cover 24 is secured in position.

The shaft is formed intermediate its length with an annular groove 25 in which operates a roller 26 connected eccentrically with a stem 27 passing up through and journaled in the top of the cap plate or cover 24. To the projecting end of said stem 27 is connected a lever arm 28 which when oscillated will, through the connection of the stem 27 with the shaft 13 reciprocate the latter for the purpose of causing the inner end thereof to clutch with the trunnion 11 or be declutched therefrom. A locking means is shown in Fig. 3 for the two different positions of the stem 27, but as this is of a character well known and no claim is being made therefor, further description is unnecessary.

Figure 3:
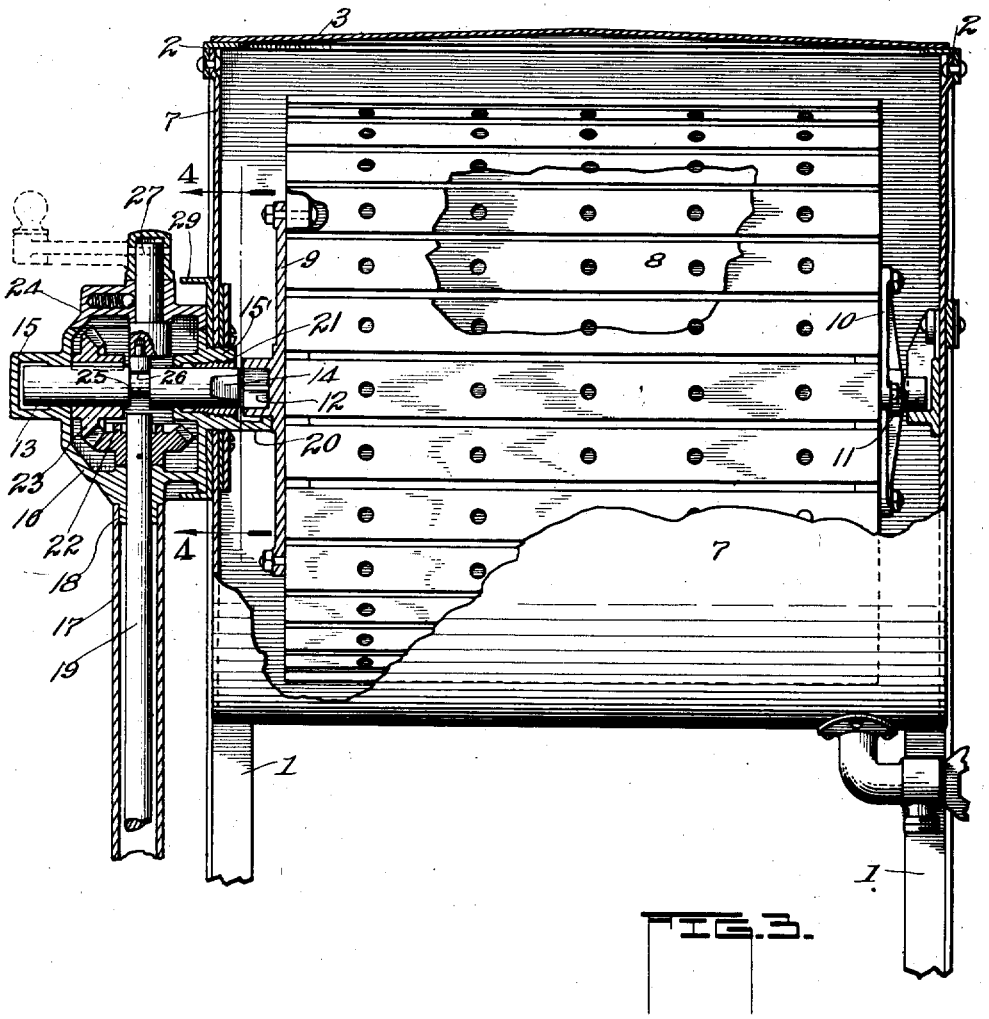
Fig. 3 is a detail in vertical cross section as the same would appear if taken on the line 3—3 Fig. 1.

The housing 16 is suitably connected with the casing 7 of the machine so that the slidable shaft 13, as will be understood, is in axial alignment with the axis of the agitator 8 and the socket trunnion 11, and to brace the casing a flanged plate 29 is provided which extends crosswise of one side of the machine, and is suitably secured to the posts or standards 1, see Figs. 1 and 3. On the inside of the casing an encircling the bearing end 15′ of the housing, is a bracing plate 30, see Figs. 3 and 4, and between said plate and said casing is a packing 30′.

When the driving mechanism of the machine is connected with the motor and such mechanism operated, the vertically disposed shaft 19 will receive power through reduction gearing, hereinafter described and when the shaft 13 is clutched to the trunnion 11 of the agitator 8, motion is imparted to said agitator. It will likewise be understood that even though the vertically disposed shaft 19 is in operation, when the shaft 13 has been declutched from the trunnion 11, said shaft 13 may be actuated but no motion is imparted to the agitator 8.

This actuation of the agitator is controlled through the lever arm 28 and is conveniently located so that the attendant may have convenient control at all times of the operation of said agitator. Said agitator is so supported in the frame of the machine that when the shaft 13 is declutched from the same and the lid or cover 3 is removed, the agitator 8 may be lifted from the machine. Of course it is understood that to insert into or remove the clothes from the agitator it is not necessary to remove the same from the machine, as these agitators are provided with removable covers to allow for the placing or removing of the clothes.

The mechanism which I employ to impart movement to the agitator is so arranged that the vertically disposed shaft 19 is rotated first in one direction and then in an opposite direction, whereby an alternate rotary motion is imparted to the agitator.

I prefer that the driving mechanism be suitably encased on the base of the machine which not only will protect the attendant, but in such a manner as to enhance the design of the machine. Such housing mechanism includes the sections of the casing 31 and 32. The lower end of the sleeve 17 which houses the vertically disposed shaft 19 is connected with said housing for the driving mechanism, and the lower end of the shaft 19 has secured thereto and within such housing a small gear wheel 33, which meshes with and is adapted to receive power from a toothed segment 34, secured to the short vertically disposed shaft 35 journaled in said housing. To this segment 34 is connected one end of a pitman 36, the opposite end of which is connected to a crank arm 37, secured on a short vertically disposed shaft 38, journaled in said housing, to which is also connected a large gear wheel 39. Meshing with the gear wheel 39 is an intermediate smaller gear wheel 40 journaled on a short vertically disposed shaft 41 and said intermediate gear wheel 40 transmits motion from the gear wheel 39 to a smaller gear wheel 42, secured on the lower end of a vertically disposed wringer driving shaft 42′ preferably encased in an upstanding sleeve 44, the lower end of which is connected with the housing for the driving mechanism and its upper end is connected with a tubular bearing 45 forming a part of or attached to a bracket 46 preferably secured to one of the four posts or standards 1 and at one corner of the machine.

The shaft last mentioned is the medium through which power is transmitted from the driving mechanism already described to the wringer mechanism to be described and is offset from said driving mechanism and the main housing enclosing the same. Meshing with the gear wheel 39 previously referred to, is a small gear wheel 47 secured to the lower end of a short vertically disposed shaft 48 which has secured to its upper end a worm wheel 49 which is encased in a superimposed housing 50 on the section 32 of the main housing, and covered by the cover plate 51 in which the upper end of the short shaft 48 is journaled. Meshing with said worm wheel 49 is a worm 52 carried on a short horizontally disposed shaft 53 on one end of which is secured a belt wheel 54; said horizontally disposed shaft 53 and its worm 52 being journaled within the superimposed housing section 50, previously referred to, and best seen in Figs. 5 and 6.

The wheel 54 is connected by means of a belt 55, see Fig. 1, with a belt wheel 56, connected with the shaft of an electric motor 57 suitably supported on the base of the machine. This motor, as is customary in machines of this character, is arranged to be connected with a source of power through an electric circuit or from some similar means. While I have elected to show that the driving means is preferably an electric motor, it is to be understood that where electricity is not available a hydrocarbon motor or some other power means may be employed.

Assuming that the machine is operated by an electric motor 57 and it is connected with a source of power, such motor will transmit motion through the pulley wheel 54 to the short vertically disposed shaft 48 and such shaft through the gearing connection with the toothed segment 34 of the intermediate gear wheel 40 will impart movement respectively to the agitator operating shaft 19 and the wringer operating shaft referred to.

The pitman connection 36 between the shaft 38 and the toothed segment 34 will impart an alternate rotary motion to the vertically disposed shaft 19, and through it a similar motion to the agitator 8, whereas the gear wheels 39, 40, and 42 will impart movement in one direction to the wringer shaft for the purpose of transmitting motion to the wringer mechanism.

The wringer mechanism to which reference has been made, includes a frame structure 58, in which is suitably journaled the wringer rolls 59 and 59′ suitably geared to the wringer driving shaft.

Figure 5:
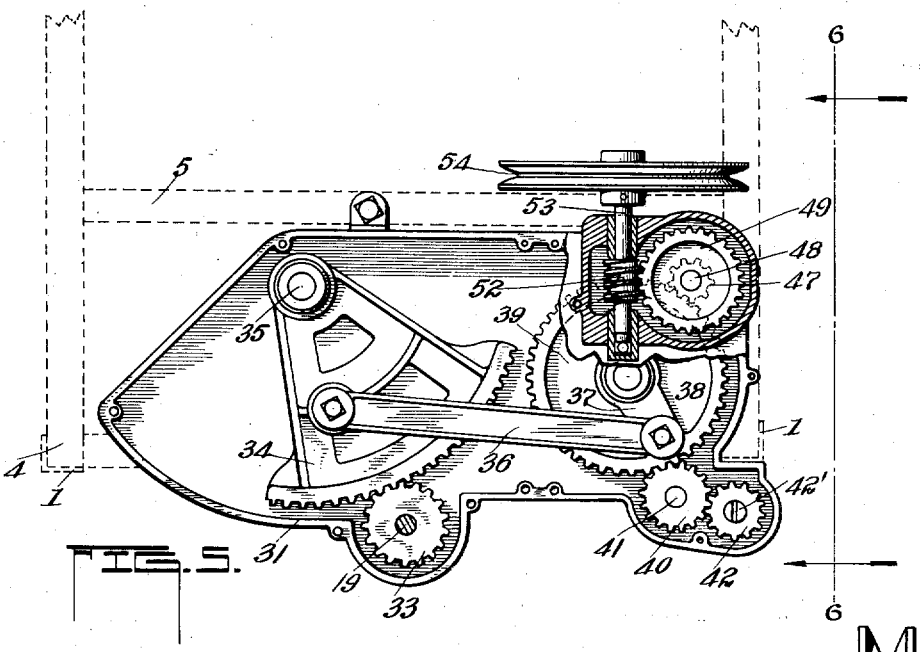
Fig. 5 is a detail in plan partially in section as the same would appear if taken on the line 5—5 Fig. 1.
Figure 6:
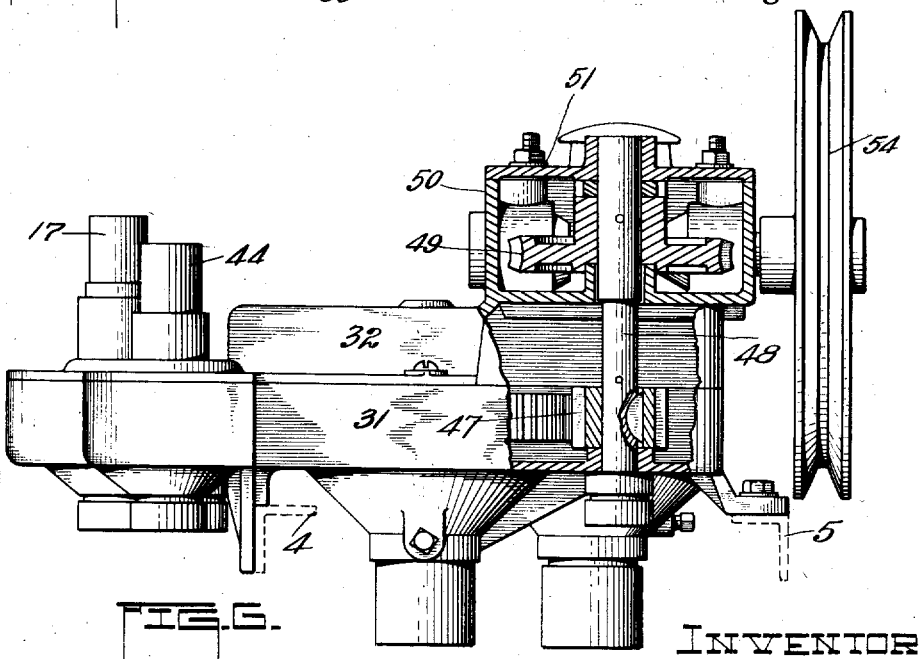
Fig. 6 is a detail partially in section as the same would appear if taken on the line 6—6 Fig. 5, except upon a somewhat larger scale.

Reference being had to Figs. 3, 5, and 6, attention is called to the fact that the construction is such that the mechanism therein shown may run in oil, which not only increases the efficiency of these operating parts but lengthens their life and increases the usefulness of the machine.

The flanged brace 29 for the casing where the housing 16 is connected thereto, is preferably made of sheet metal and stamped or otherwise formed to give the shape shown for the purpose of strength. This does away with a heavy, cumbersome casing such as have been used heretofore and also lowers the cost.

From the foregoing description, taken in connection with the drawings, it will be apparent that I have evolved a washing machine where the causing enclosing the driving mechanism is supported on the machine base below the agitator and geared through a suitable arrangement of reduction gearing to a vertically disposed shaft adapted to impart alternate rotary movement to said agitator and have so disposed the gearing included in said driving mechanism as to impart power to the vertically disposed wringer shaft which is off-set from said driving mechanism and the main housing enclosing the same; said wringer shaft being necessarily off-set to clear the housing and machine frame and enclosure for the agitator.

What I claim is:—

1. In a machine of the character described, in combination, a frame, a casing within and secured to said frame, a housing connected with said casing and formed with axially disposed spaced end bearings, a bracing plate for the housing and casing disposed in horizontal position crosswise of said casing on the outside thereof between said housing and casing and secured to said frame, and a bracing plate connected to the inside of the casing and encircling the inner bearing of said housing.

2. In a machine of the character described, in combination, a casing, a washing element provided with an axially disposed clutch socket, a reciprocally supported shaft having a clutch on one end arranged for clutch engagement with the clutch socket of said element, means for moving said shaft into and out of clutch engagement with said element, a vertically disposed driving shaft, gearing connecting the two said shafts, driving gearing on the base of the machine including an oscillatory toothed segment, driving connections between said driving gearing and said vertically disposed shaft, a motor, and means for actuating said driving gearing from said motor.

3. In a machine of the character described, in combination, a casing, a washing element provided with an axially disposed clutch socket, a reciprocally supported shaft having a clutch on one end arranged for clutch engagement with the clutch socket of said element, means for moving said shaft into and out of clutch engagement with said element, a vertically disposed driving shaft, gearing connecting the two said shafts, gearing arranged on the base of the machine, such gearing including a toothed segment, a crank arm, and a pitman connection between said crank arm and said segment, gearing connecting the segment with the vertically disposed shaft, a housing for said last mentioned gearing and connections, a motor, and means for actuating said gearing from said motor.

4. In a machine of the character described, in combination, a casing, a washing element removably journaled within said casing, a shaft in axial alignment with said element and arranged for clutch connection therewith, means for moving said shaft into and out of clutch engagement with said element, a vertically disposed shaft, gearing connecting the two shafts, a toothed segment supported to be oscillated adjacent the lower end of said vertically disposed shaft, a gear wheel on the lower end of the vertically disposed shaft and arranged to be operated by said segment, a pitman connected with said segment, a crank connected with said pitman, gearing for operating the crank, a motor, and a driving connection between said motor and said gearing.

5. In a washing machine, in combination, a casing, a washing element removably supported in said casing and rotatable alternately in opposite directions, a trunnion connected axially with one side of said element and provided with a clutch socket, a horizontally arranged shaft adapted to be moved endwise into and out of clutch engagement with said trunnion, bevel gearing for actuating said shaft through one of which the latter may be moved, a hand lever to reciprocate said shaft, a vertically disposed shaft arranged to actuate said gearing, and gearing arranged to continuously impart alternate rotary motion to said vertical shaft and to said clutch shaft through said bevel gearing when said clutch shaft is in clutch relation with or declutched from said trunnion.

6. In a washing machine, in combination, a casing, open bearing seats secured axially to the opposite inside walls of said casing, a washing element, trunnions connected axially with said element and adapted to have a removable bearing relation with said bearing seats, one of said trunnions provided with a clutch socket, a housing secured to the outside of said casing, bevel gearing journaled within said housing, a shaft disposed horizontally within said housing and having a spline and groove connection with one of said bevel gears and movable endwise therethrough and through said housing and casing and adapted to be moved into and out of engagement with said socketed trunnion, a lever on said housing in operative connection with said shaft, a vertically disposed shaft in operative connection with said bevel gearing, and gearing arranged to continuously impart alternate rotary motion to said vertical shaft and to said clutch shaft through said bevel gearing when said clutch is in clutch relation with or declutched from said trunnion.

7. In a washing machine, in combination, a casing, a washing element removably journaled in said casing and rotatable alternately in opposite directions, a horizontally disposed clutch shaft arranged to be moved into and out of axial clutch engagement with said element, bevel gearing associated with said clutch shaft and through one of which said shaft is axially movable, and a vertically disposed operating shaft arranged to continuously impart alternate rotary motion to said clutch shaft through said bevel gearing when said shaft is in clutch relation with or declutched from said element.

8. In a washing machine, in combination, a casing, a washing element removably supported in said casing and rotatable alternately in opposite directions, means to actuate said element, including a driving element movable into and out of axial clutch engagement with said element, a vertically disposed shaft in constant operative relation with said driving element, means to continuously impart alternate rotary motion to said shaft, and means to reciprocate said driving element, the latter movable into and out of clutch engagement with said element without disturbing its operative relation with said driving shaft.

9. In a washing machine, in combination, a casing, a washing element removably supported in said casing and rotatable alternately in opposite directions, means to actuate said element, including a driving element movable into and out of axial clutch engagement with said element, a vertically disposed shaft in constant operative relation with said driving element, an oscillatory segment rack in operative relation with the lower end of said shaft to continuously impart alternately rotary motion thereto, means for oscillating said rack, and means to reciprocate said driving element, the latter movable into and out of clutch engagement with said element without disturbing its operative relation with said driving shaft.

10. In a washing machine, in combination, a frame support including a housing, an agitator mounted in said housing so as to permit alternate rotary movement thereof, a gearing enclosing housing supported in said frame below said agitator and having bearings for vertically disposed shafts one being off-set whereby to position the shaft journaled therein outside of and alongside said frame support, a shaft journaled in said off-set bearing, a shaft journaled in one other of said bearings and extending upwardly to said agitator, means to operatively connect said last mentioned shaft with said agitator, a horizontally disposed driving shaft journaled in said housing, a large intermediate gear geared to said driving shaft and geared to said offset shaft through intermediate reduced gearing, a segment gear, a crank and pitman connection between said large intermediate gear and said segment gear, and a reduction gear between said segment and said agitator operating shaft.

11. In a washing machine, in combination, an agitator mounted for alternate rotary movement, a driving mechanism arranged below the agitator, a housing for said mechanism, said mechanism including a horizontally disposed driving shaft with a worm thereon, a vertically disposed transmission shaft having a worm wheel thereon geared to said worm and with a small gear pinion in its lower end, a vertically disposed operating shaft off-set from said driving and transmission shafts having a large gear wheel thereon meshing with said gear pinion, a segment gear mounted for oscillatory movement in a horizontal plane, reciprocal driving connections between said operating shaft and said segment, a vertically disposed off-set shaft, reduction gearing between said off-set shaft and said large gear wheel, a vertically disposed agitator operating shaft, and a gear connection between said last mentioned shaft and said segment.

12. In a machine of the character described, in combination with a supporting frame and a container supported therewithin, of a substantially shallow gear housing supported by the frame below the container and comprising upper and lower sections, an elongated vertically disposed sleeve off-set to the body of the housing and located outside the frame, a gear housing relatively smaller than said first mentioned housing and superimposed in relation thereto, a pair of vertically disposed operating shafts one of which is disposed in said off-set sleeve, a driving means journaled in said superimposed housing, gearing disposed between said sections of housing, means to actuate said gearing from said driving means, and means to actuate said operating shafts from said gearing.

13. In a machine of the character described, in combination with a supporting frame and a container supported therewithin, of a substantially shallow gear housing supported by the frame below the container and comprising upper and lower sections, an elongated vertically disposed sleeve off-set to the body of the housing and located outside the frame, a gear housing relatively smaller than said first mentioned housing and superimposed in relation thereto, a pair of vertically disposed operating shafts one of which is disposed in said off-set sleeve, a driving means journaled in said superimposed housing, gearing disposed between said sections of housing, means to actuate said gearing from said driving means, means in said gearing to impart oscillatory movement to one of said operating shafts, and means in said gearing to impart rotative movement to the operating shaft within said sleeve.

In witness whereof, I have hereunto affixed by hand this 18 day of November, 1927.

ALPHEUS W. ALTORFER.